United States Patent
Agrawal et al.

(10) Patent No.: US 8,996,539 B2
(45) Date of Patent: Mar. 31, 2015

(54) COMPOSING TEXT AND STRUCTURED DATABASES

(75) Inventors: Rakesh Agrawal, San Jose, CA (US); Anitha Kannan, Mountain View, CA (US); John C. Shafer, Los Altos, CA (US); Ariel Fuxman, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

(21) Appl. No.: 13/561,085

(22) Filed: Jul. 30, 2012

(65) Prior Publication Data

US 2013/0275441 A1  Oct. 17, 2013

Related U.S. Application Data (60) Provisional application No. 61/623,809, filed on Apr. 13, 2012.

(51) Int. Cl.
*G06F 7/00* (2006.01)
*G06F 17/30* (2006.01)

(52) U.S. Cl.
CPC .................. *G06F 17/30616* (2013.01)
USPC ............ 707/749; 707/759; 707/769

(58) Field of Classification Search
CPC ............ G06F 17/30598; G06F 17/30707; G06F 17/3089; G06F 17/30914; G06F 17/30997; Y10S 707/99943; Y10S 707/99945
USPC ...................................................... 707/749
See application file for complete search history.

(56) References Cited

U.S. PATENT DOCUMENTS

| | | |
|---|---|---|
| 6,424,980 B1 | 7/2002 | Iizuka et al. |
| 6,507,855 B1 | 1/2003 | Stern |
| 6,732,102 B1 | 5/2004 | Khandekar |
| 7,209,923 B1 | 4/2007 | Cooper |
| 7,225,411 B1 * | 5/2007 | Stoner et al. .................. 715/760 |
| 7,689,906 B2 | 3/2010 | Bax et al. |
| 7,945,561 B1 * | 5/2011 | Li et al. .......................... 707/714 |

(Continued)

OTHER PUBLICATIONS

Reddy, et al., "A Methodology for Integration of Heterogeneous Databases", Retrieved at <<http://ieeexplore.ieee.org/stamp/stamp.jsp?tp=&arnumber=334882>>, IEEE Transactions on Knowledge and Data Engineering, vol. 6, No. 6, Dec. 1994, pp. 920-933.

(Continued)

*Primary Examiner* — Binh V Ho
(74) *Attorney, Agent, or Firm* — Micah Goldsmith; Judy Yee; Micky Minhas (57) ABSTRACT

A framework is provided for composing texts about objects with structured information about these objects, and thus disclosed are methodologies for linking information from at least two data sources—one comprising a plurality of documents comprising text pertaining to at least one object, and one comprising a plurality of structured records comprising at least one characteristic of the at least one object, each characteristic comprising one property name and an associated property value corresponding to the property name for the at least one object—by determining one or more instance-based traits for each object in both data sources and associating at least one record with at least one document that refers to each object, each trait comprising one or more characteristics that identifiably distinguish each object from all other objects.

19 Claims, 7 Drawing Sheets

(56) References Cited

U.S. PATENT DOCUMENTS

| | | | |
|---|---|---|---|
| 2003/0225742 A1* | 12/2003 | Tenner et al. | 707/2 |
| 2006/0041465 A1* | 2/2006 | Woehler | 705/10 |
| 2006/0184566 A1* | 8/2006 | Lo et al. | 707/102 |
| 2007/0156755 A1* | 7/2007 | Gonzalez | 707/104.1 |
| 2008/0281684 A1* | 11/2008 | Stefanik et al. | 705/14 |
| 2009/0024639 A1* | 1/2009 | Steinmann | 707/100 |
| 2010/0223064 A1* | 9/2010 | Westphal | 705/1.1 |
| 2010/0306214 A1* | 12/2010 | Paparizos et al. | 707/759 |
| 2011/0112886 A1* | 5/2011 | Rizzolo et al. | 705/7.28 |
| 2011/0289026 A1* | 11/2011 | Kannan et al. | 706/12 |
| 2012/0030032 A1* | 2/2012 | Zurada | 705/14.66 |
| 2012/0066253 A1* | 3/2012 | Osborn et al. | 707/769 |

OTHER PUBLICATIONS

Vitt, et al., "Data Integration Solutions for Master Data Management", Retrieved at <<http://technet.microsoft.com/en-US/library/aa964123(v=SQL.90).aspx>>, Mar. 2006, pp. 14.

Zhao, Huimin, "Semantic Matching across Heterogeneous Data Sources", Retrieved at <<http://citeseerx.ist.psu.edu/viewdoc/download?doi=10.1.1.88.5933&rep=rep1&type=pdf>>, Communications of the ACM—The patent holder's dilemma: buy, sell, or troll vol. 50, Issue 1, Jan. 2007, pp. 45-50.

Chakaravarthy, et al., "Efficiently linking text documents with relevant structured information", Retrieved at <<http://citeseerx.ist.psu.edu/viewdoc/download?doi=10.1.1.97.2316&rep=rep1&type=pdf>>, VLDB '06 Proceedings of the 32nd international conference on very large databases, Sep. 12, 2006, pp. 667-678.

Dalvi, et al., "Matching reviews to objects using a language model", Retrieved at <<http://www.research.yahoo.net/files/emnlp09-match.pdf>>, EMNLP '09 Proceedings of the 2009 Conference on Empirical Methods in Natural Language Processing: vol. 2, Sep. 4, 2009, pp. 609-618.

Dalvi, et al., "Translation model for matching reviews to objects", Retrieved at <<http://research.yahoo.net/files/cikm09-obj.pdf>>, CIKM '09 Proceedings of the 18th ACM conference on information and knowledge management, Sep. 4, 2009, pp. 167-176.

* cited by examiner

| Model | Brand | Product Line | Resolution | Weight |
|---|---|---|---|---|
| SD1300IS | Canon | Powershot | 12 mp | 3.7 oz |
| A400 | Fuji | FinePix | 4 mp | 4.4 oz |
| A400 | Canon | Powershot | 3 mp | 5.8 oz |
| 600 | Olympus | Stylus | 6 mp | 4.5 oz |

FIG. 1

| Record ID | Model | Brand | Product Line | Resolution | Weight |
|---|---|---|---|---|---|
| 679 | SD1300IS | Canon | Powershot | 12 mp | 3.7 oz |
| 3591 | A400 | Fuji | FinePix | | |
| 4300 | A400 | | Powershot | | 5.8 oz |

| TraitID | Trait |
|---|---|
| 1 | Brand = Canon, Model = 40D |
| 2 | Brand = Canon, ProductLine = EOS, Resolution = 10.1 MP |
| 3 | Brand = Canon, ProductLine = Camera, Resolution = 10.1 MP |
| 4 | Brand = Samsung, Model = SL605 |
| 5 | Brand = Canon, Model = A400 |
| 6 | Brand = Fuji, Model = A400 |
| 7 | Model = LN52A750 |

FIG. 9  412'

| DocID | Attribute | Value |
|---|---|---|
| 20 | Brand | Samsung |
| 20 | Model | SL605 |
| 20 | Resolution | 12.3 MP |
| 20 | LCD Size | 2.7 in |
| 20 | Optical Zoom | 3x |

FIG. 10  414'

| DocID | TraitID |
|---|---|
| 20 | 1 |
| 37 | 37 |
| 37 | 108 |
| 65 | 30 |
| 65 | 22 |

FIG. 11  416'

| DocID | ObjectID |
|---|---|
| 20 | 100 |
| 37 | 43 |
| 37 | 52 |
| 65 | 250 |
| 65 | 285 |

FIG. 12  418'

| DocID | ObjectID | Score |
|---|---|---|
| 20 | 100 | 1.0 |
| 37 | 43 | 0.7 |
| 37 | 52 | 0.3 |
| 65 | 250 | 0.9 |
| 65 | 285 | 0.1 |

| Property Name | Property Value (v) | Frequency of v in db | P(s = db \| v) |
|---|---|---|---|
| Brand | Canon | 758 | 0.961 |
| Product Line | Canon | 22 | 5.18E-05 |
| Brand | NextWindow | 23 | 0.951 |
| Brand | Orion | 1 | 1.21E-05 |
| Product Line | Orion | 2 | 1.24E-05 |
| Brand | iSonic | 26 | 0.95 |
| Brand | Other | 20 | 1.15E-05 |
| Brand | Kobian Group | 12 | 0.945 |

COMPOSING TEXT AND STRUCTURED DATABASES

CROSS-REFERENCE TO RELATED APPLICATIONS

This application claims priority under the benefit of 35 U.S.C. §119(e) to Provisional Patent Application No. 61/623,809, filed Apr. 13, 2012. This provisional patent application is hereby expressly incorporated by reference herein in its entirety.

BACKGROUND

It has become common for users of computer-type devices to connect to the World Wide Web (the "web") and employ web browsers and search engines to locate web pages (or "documents") having specific content of interest to them (the users). As a result, an ever-increasing amount of data is becoming accessible online, and today the web already contains tens of billions of web pages. Many structured repositories for these web pages are also widely available, and it is useful to link information available in these various data sources. To this end, there are initiatives aimed at providing specifications for linking data objects from disparate data sources, and the corresponding research on composing information from multiple sources is already quite extensive. However, automating the task of linking information from various data sources is problematic largely because this abundance of data is being created in an ever-growing variety of forms and formats.

Current solutions to composing data from multiple sources include identifying similar structured records, linking text documents, and matching structured records to text data. Some of these solutions may also employ techniques to identify the object that is the topic of a review and then hypothesize a language model underlying the creation of reviews which is then used for finding the object (or objects) most likely to match the topic of a review. To improve results, such solution are often generalized to allow for attributes in structured records to have different weights and admit semantic translations of values, but such approaches are highly dependent upon good pre-categorization of documents and the structured records pertaining to same. Meanwhile, current work to linking text documents has focused on identifying mentions of phrases representing concepts (i.e., "named entities") in one document and linking them to other documents that have in-depth information about those concepts. For such approaches, concept phrases are identified and disambiguated using rules, machine learning, or other information extraction techniques. As for matching text to structured records, most known approaches generally involve extracting structured data from text and then matching these structured records.

The foregoing techniques have been widely used often to algorithmically build structured databases, but methods for later extracting information from these structured databases often provide only limited accuracy unless also coupled with a substantial labeling effort. One proposed solution is to match concise text snippets to structured records, where the text snippets correspond to brief descriptions of merchant offers that need to be matched to the structured specifications in a product catalog, and thereby identify pieces of text that are identical to values in structured records and tag those records with the corresponding property names. The text is thus reduced to tuples of pairs, each pair comprising a value and a set of plausible property names, and a match between this representation of a text and a structured record is then scored by choosing the optimal property name for each value and checking whether the values are the same or different for identical property names of the two. However, these proposals tacitly assume that the text and structured records have been accurately classified in accordance with some taxonomy, and building good taxonomies and accurate classifiers is very difficult to achieve in practice.

SUMMARY

Various implementations disclosed herein are directed to a framework for composing texts about objects with structured information pertaining to those objects. The framework utilizes the concept of a "trait" which herein is defined as a set of characteristics that can serve as the proxy for the identity of an object and that, in contrast to database keys for example, are instance-based rather than schema-based. Thus the various implementations employ specific techniques for computing traits, mapping structured records and text documents to these traits, and then joining information about the same object from two different data sources (or "repositories").

Certain implementations disclosed herein associate records in a structured database with text documents in a corpus, such that records and documents are paired if they refer to the same object (e.g., a person, business, product, etc.) while no assumptions are made regarding the structure of the two data sources. For such implementations, each text document is processed as a bag of words having no categorization or structure to identify the objects being discussed, while each structured record is viewed as a set of key-value pairs (e.g., <color, blue>) that serve to describe various characteristics pertaining to an object. For several such implementations, knowledge of the significance of the characteristics or their role in distinguishing objects within a domain is not required and, as a result, such implementations are not restricted to or specialized for any particular domain.

Several implementations disclosed herein are also directed to linking information from at least two data sources—including a first data source comprising a plurality of documents comprising text pertaining to at least one object, and a second data source comprising a plurality of structured records comprising at least one characteristic of the at least one object—utilizing a processor for determining an instance-based trait for the at least one object and for associating at least one record in the second data source with the at least one document from the first data source that refers to the at least one object.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative implementations, is more fully understood when read in conjunction with the appended drawings. For the purpose of illustrating the implementations, there is shown in the drawings example constructions of the implementations; however, the implementations are not limited to the specific methods and instrumentalities disclosed. In the drawings.

DETAILED DESCRIPTION

In considering the general problem of automating the linking of information from various data sources, it should be noted that many text documents and structured records often contain information about some specific "object," that is, an entity of interest such as a person, place, product, event, and so forth. For example, data sources containing text documents written in a natural language often discuss some aspects of one or a small number of objects, although there are no markings or structure in any of the documents that explicitly identifies the objects that the document is about. Thus each text document may be viewed as a bag of words. In contrast, data sources that comprise a collection of structured records contain information in each record about some of the characteristics of some object, and each characteristic in turn may comprise a property name and a corresponding value for that property name, although such records would not explicitly contain the identity of objects to which the record pertains.

For the various implementations discussed herein, a universe of objects is postulated in which each object is described by a set of characteristics. Such objects have an implicit unique identity such that different objects may include one or more of the same characteristics but necessarily differ in at least one characteristic. For these various implementations, a framework for composing texts about the objects and structured information pertaining to the same is based on the concept of an instance-based "trait" comprising a set of characteristics that can serve as the proxy for the identity of an object. As such, the various implementations disclosed herein are directed to computing traits, mapping structured records and text documents to traits, and/or joining information about the same object from at least two repositories.

Several such implementations may have broad application to the area of web search where the web pages (as documents) are each endowed with at least one object corresponding to the web page content. This, in turn, will enable a search engine to exploit structure present in the document to answer queries based not just on matching keywords but also by taking into account semantics of the queries to match structured values. Consequently, web pages may be augmented with information having structured data to enable the web page to better "surface" in search results even when the queried words are not present in the web pages (which would normally preclude it from search results) because its corresponding structured source comprises the corresponding relevant information to the query and helps identify the web page as highly relevant to the query.

Several such implementations may also have broad application to verticals such as online shopping searches where, in addition to retrieving structured records for the products, the vertical may also retrieve relevant web pages about the products being queried since an implementation can identify the relevant products (or more generally objects) among such web pages. Of course, shopping is just one of many verticals to which the various implementations herein disclosed may apply, and these various implementations may be applied to other verticals as well, and these innumerable other applications will be readily evident to skilled artisans.

As such, a framework (representative of several implementations disclosed herein) is provided for composing texts about objects with structured information about these objects, and thus disclosed are methodologies for linking information from at least two data sources—one comprising a plurality of documents comprising text pertaining to at least one object, and one comprising a plurality of structured records comprising at least one characteristic of the at least one object, each characteristic comprising one property name and an associated property value corresponding to the property name for the at least one object—by determining one or more instance-based traits for each object in both data sources and associating at least one record with at least one document that refers to each object, each trait comprising one or more characteristics that identifiably distinguish each object from all other objects.

Part I: Overview of Various Implementations

Various implementations disclosed herein utilize a text document and a structured database. A text document may be a bag of words that does have any categorization of objects within its text according to any taxonomy. A structured database may be an arbitrary collection of records obtained from multiple sources—for example, in a product catalog the product specifications might have been obtained from multiple data providers—wherein the records are sets of pairs of property names and values. To describe the various implementations disclosed herein, assume a universe of objects (Ö) where each object is represented by a collection of characteristics, and each characteristic is a property <name, value> pair (that is, a property name and an associated property value corresponding to the property name for that object).

Figure 1:
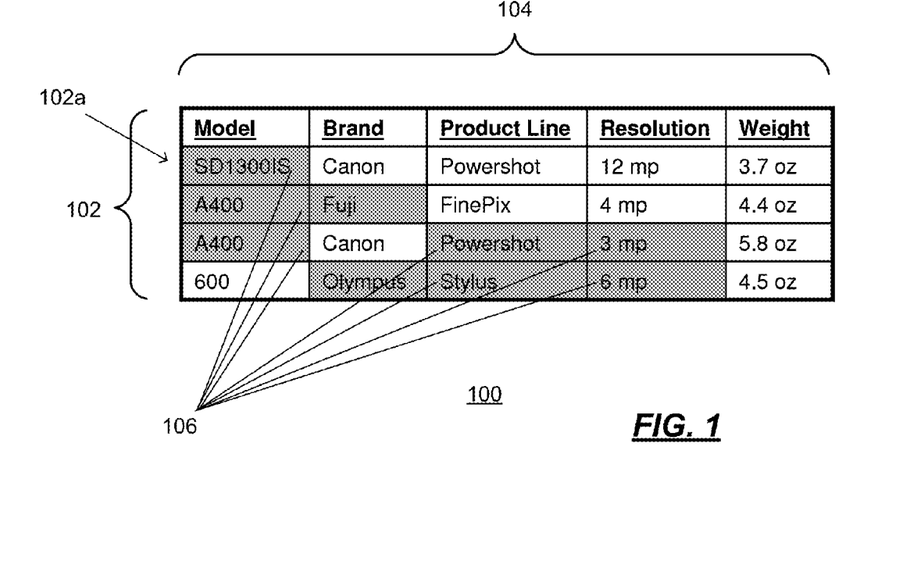
FIG. 1 is a table representing four objects and a subset of characteristics associated with each object in accordance with various implementations disclosed herein.

FIG. 1 is a table 100 representing four objects 102 (one per row) and a subset of characteristics 104 (organized in columns) associated with each object in accordance with various implementations disclosed herein. As illustrated in this figure, the table 100 illustrates perfect and complete information regarding the four objects 102 with regard to their corresponding characteristics 104. Of course, access to perfect and complete information of any kind is atypical in the real world, and perfect and complete information of Ö is rarely (if ever) achievable. Instead, at most one has access to a subset of objects in Ö as a collection of records, and this collection of records (Ř) may have only a random subset of characteristics that are relevant to its subset of objects from Ö.

Figure 2:
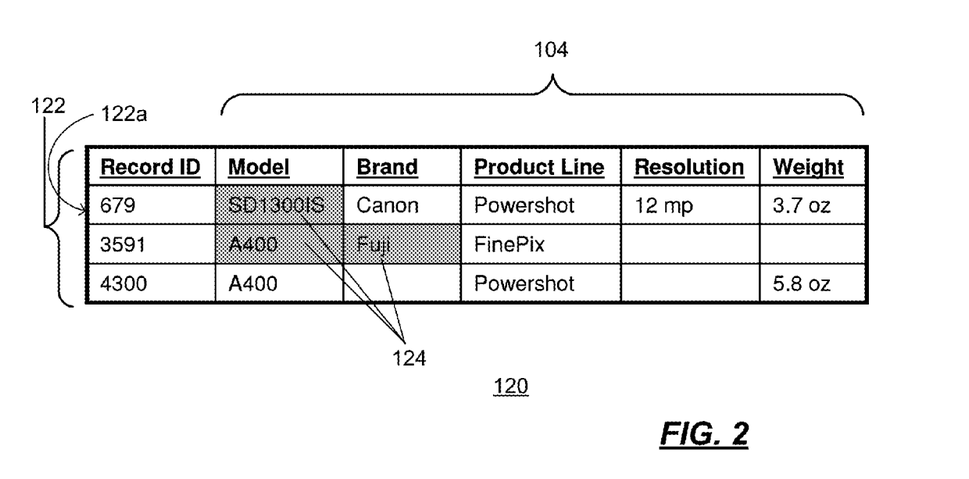
FIG. 2 is a table representing records corresponding to a subset of objects and known characteristics from FIG. 1.

FIG. 2 is a table 120 representing records 122 (one per row) corresponding to as subset of objects 102 and known characteristics 124 from FIG. 1. The known characteristics 124 are organized in columns according to the various characteristics 104 possible, and empty characteristic blocks represent unknown information with regard to the records 122 listed in the table 120.

Figure 3:
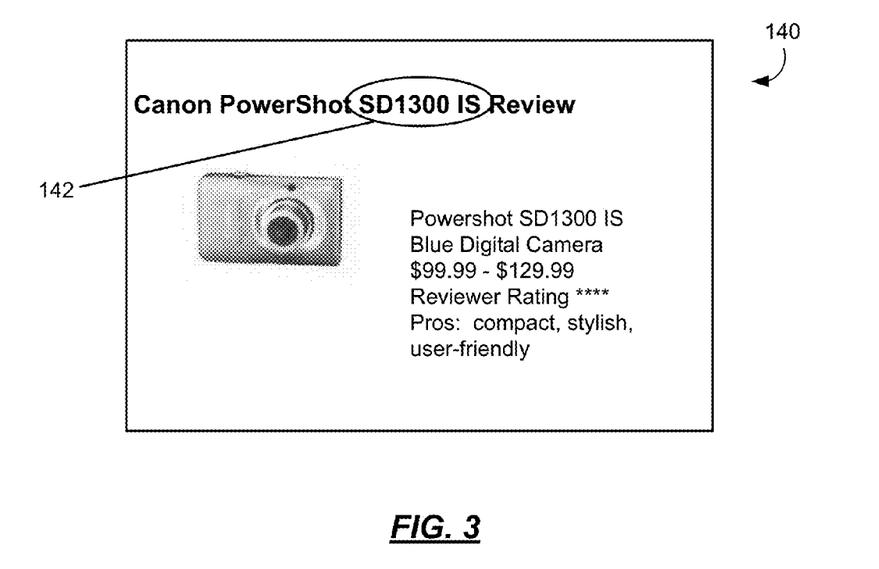
FIG. 3 illustrates an example text document comprising data that corresponds to the first record of FIG. 2 (and the first object of FIG. 1) representative of several implementation herein disclosed.

FIG. 3 illustrates an example text document 140 (here a product web page) comprising data 142 that happens to correspond to the first record 122a of FIG. 2 (as well as the first object 102a of FIG. 1) representative of several implementation herein disclosed. In other words, based on the data 142, this text document 140—which is just one text document from the subset of accessible text documents (Ď) from the universe of all documents (D)—can be identified as a text document containing information about one or more objects, in this case, object 102a corresponding to record 122a.

With regard to FIGS. 1-3, several implementations disclosed herein are directed to composing records in Ř with text from Ď. Conceptually, the records in Ř and text from Ď are mapped to object identifiers before Ř is composed with Ď; however, in some implementations, there are no explicit identifiers for all of the objects in Ö, and thus a surrogate for a subset of the explicit identifiers for Ö is used. For these several implementations, a distinct combination of characteristics pertaining to each object serves as a proxy for a distinguishable identifier for that object. More specifically, each object has multiple distinguishing sets of characteristics (e.g., traits) that may be used in turn to identifiably distinguish each object from the other objects. In FIG. 1, this distinguishing combination of traits for each object 102 (and on a row-by-row basis) is indicated using shaded boxes 106 (i.e., the shaded boxes in the same row as the object correspond to that object). As shown, for certain object (e.g., object 102a) a single characteristic (e.g., Model=SD1300IS) may alone completely distinguish one camera object from all others, while other objects may use two or more characteristics (e.g., Model=A400 and rand=Fuji) to uniquely identify and thereby distinguish an object from the other objects. It is also possible (and often the case) that an object may have more than one trait (i.e., combination of characteristics) that identifiably distinguishes (i.e., that uniquely identifies) the object from among the other objects.

In this manner, traits may serve as "signatures" of sorts for objects in O. Therefore, identifying these traits in Ř and Ď allows them to be associated with the objects to subsequently perform composition using the mapped set of traits. As such, the mapping function amounts to mapping records in Ř and text documents in Ď to a predetermined set of traits. For example, and referring again to FIG. 2, certain records for which the traits can be identified, and hence associated, have traits that are shown with shaded boxes 124. It should be noted that the third record (having Record ID 4300) may also have one of two traits, either (a) A400 and Powershot or (b) A400 and 5.8 oz, although neither trait has been specifically indicated in the figure. FIG. 3, on the other hand, shows that trait 142 has been identified in the document and that this trait 142 corresponds to Model=SD1300IS.

For several implementations, the mapping function may independently associate traits to records and text documents, and it should be noted each document may contain multiple traits corresponding to different objects. For example, consider a text document that reviews a product object by contrasting it with another product object. In this document, the traits for both of these products may be identified. Therefore, to facilitate the composition between a record and text, these several implementation may use a scoring function that utilizes additional characteristics (in addition to traits) present on the text document and in the records in order to score that particular text document's relevancy to a record that shares at least one of the traits in the document. As such, these implementations may use trait computations to identify signatures of objects, mapping functions to map traits to records and documents, and the composition function to compose the documents into the subset of relevant records out of the records that share at least one trait with the document. These elements are discussed in greater detail herein.

Text documents generally contain a larger number of property values corresponding to more relevant objects than less relevant objects, and such text documents also mention the more relevant objects with much higher frequency. As such, text documents have two highly-relevant features: (1) the fraction of distinct property names corresponding to property values found in the joining structured record and the text document that overlap, and (2) the weighted fraction of property values that overlap, where the weight is determined through the relative frequency of the corresponding property name and property value pairings. Moreover, when a small number of features are used, there is no need for a large amount of training data.

Part II: Associating Structured Records to Text Documents

Various implementations disclosed herein employ techniques for associating corresponding structured records to text documents. For several such implementations, these techniques are described in the context of two independently created data sources, the first of which contains text documents each discussing one or more (but generally a small number of) objects, and the second being a collection of structured records each containing information about the characteristics of some objects.

In order to associate a document to its relevant objects, it suffices to look at the object traits (T) that appear in the document. Again, traits are sets of attribute value pairs that serve to distinguish objects from each other and are computed directly from the structured database. For example, it may be determined from the structured database that the single attribute value pair T=<model, SD1300IS> is distinguishing enough to uniquely identify that a particular record is about the camera "Canon SD1300IS". Although traits bear some resemblance to "keys" used in relational databases, it should be noted that traits are fundamentally different because traits are instance-based rather than schema-based (as is the case for relationship database keys). For example, and referring again to FIGS. 1 and 2, the "Fuji FinePix A400" camera may need to use the longer trait {<model, A400>, <brand, Fuji>} than just the simpler <model, A400> because the latter identifier is insufficient to distinguish the "Fuji FinePix A400" from the "Canon Powershot A400".

The implementation framework for several implementations disclosed herein uses a trait generation algorithm that draws upon a connection of the problem with that of finding infrequent item sets while also using a graphical model to identify unsafe attribute value pairs that can lead to an invalid trait. Consider the following example: There is a camera called "Olympus Stylus 600" and {<brand, Olympus>, <model, 600>} might appear to be a reasonable trait computed from the database. However, the term "600" may appear in many documents for reasons unrelated to a model number (e.g., a price of 600 dollars). Thus, such a trait could lead to associating wrong documents to the Olympus camera. However, there may still be other traits—better traits—that could instead be used for mapping such as, in the foregoing example, {<brand, Olympus>, <line, Stylus>, <resolution, 6 mp>}.

The presence of a particular trait in a document is a strong indicator that the document refers to the object that the trait represents. However, a document may contain traits corresponding to multiple objects, with different degrees of importance of the document to them. To handle this, the framework also includes a machine-learned scoring function that provides a probabilistic score of agreement between matched documents and objects by leveraging the attribute-value pairs present in them. It should be kept in mind that the mere occurrence of a trait value does not imply that the document is about an object in the database.

This framework may be applied to a number of applications including web search, for example, by augmenting the web index with structured data for improving relevance and enriching search snippets.

Part III: Additional Details for the Conceptual Framework
Review of Context of Operation If one postulates a universe of objects Ö, then each object O∈Ö may be described by a set of characteristics. A characteristic X comprises a property name N and its value V, i.e., X←(N,V) (or equivalently (N=V)), and O←{X}. As such, property names and values may be arbitrary strings. Herein is denoted by X̃ the set of all characteristics, by Ñ the set of all property names, and by V̂ the set of all property values. Different objects may have many of the same characteristics, but they differ at least in one characteristic, and thus every object can be thought of as having an implicit unique identity (although the object identity is not itself manifest).

For various implementations disclosed herein, a structured repository Ř and a text repository Ď are provided. The structured repository Ř contains the representations of objects from Ö, called records. Records comprise a set of characteristics (pairs of property names and their values) from objects, and there are no duplicates (identical records) in Ř. An object may be underrepresented in Ř; that is, property names in a record may only be a proper subset of property names in the object.

Records do not have primary keys, and thus an object may have multiple representations in Ř such that there may be more than one record, say $R_1$ and $R_2$, corresponding to the same object O but each having a different set of property names. Since records are in general an under-representation (or subset) of objects (i.e., all objects in Ö), it is possible that a record may represent more than one object.

The text repository Ď comprises text documents containing information about the objects in Ö where the text document is treated as a bag of words. As such, the text does not contain any explicit markings that can be used to identify the objects that the text is about; however the text may contain some of the property names and values that pertain to the objects described in the text. In addition, a text may contain information about objects for which there is no representation in Ř and, conversely, there may not be any text in Ď for a particular object, although this object still has a representation in Ř.

Data Model

If Ĩ represents the set of (hypothetical) object identities corresponding to objects in Ö, then the function RI: Ř→(Ĩ) results where P(Ĩ) represents the powerset of identities in Ĩ. Given a record R∈Ř, RI (R) yields the set of object identities {I}, where every I in this set corresponds to an object O∈Öthat R represents. Similarly, the function DI: Ď→P(I) is such that DI(D) yields the set of identities of the objects that the text D is about.

Given these mapping functions, a result is defined by the following composition (given in pseudo-SQL syntax):

```
select R, D
from Ř R, Ď D
where ∃ I_R ∈ RI(R) ∧ ∃ I_D ∈ DI (D) ∧ I_R = I_D
```

With this in mind, presented below are algorithms for implementing the above composition. It should be noted, however, that the objects in the example framework do not have manifest identities, and therefore the computation methodology does not provide explicit implementation of RI or DI but instead aims to obtain the result of the prescribed composition.

Algorithm

Figure 4:
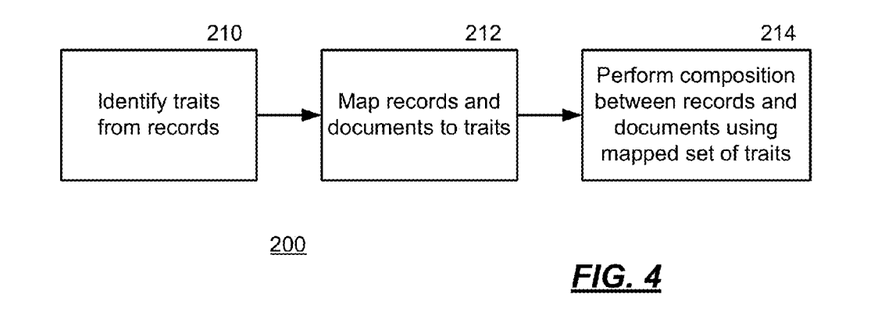
FIG. 4 is a process flow diagram illustrating an exemplary method for composing text and structured databases representative of various implementations disclosed herein.

FIG. 4 is a process flow diagram 200 illustrating an exemplary method for composing text and structured databases representative of various implementations disclosed herein. At 210, a set of traits are identified from the records in Ř. At 212, the records in Ř and the documents in Ď are mapped to these traits. At 214, a composition is performed between the records in Ř and the documents in Ď using the mapped set of traits. As previously mentioned earlier herein, ideally records and text would be mapped to object identifiers before Ř is composed with Ď; however, objects in Ö do not have explicit identifiers. Therefore, objects may instead be defined and distinguished by their characteristics, and thus various implementations disclosed herein search for distinct characteristics that can proxy as object identifiers and are referred to herein as traits. Thus, given a set of traits for Ö, if those traits can be identified in Ř and Ď, then the composition can be correctly effected. The mapping functions in the framework are then tantamount to mapping records in Ř and documents in Ď to a predetermined set of traits, and the composition is then performed over these mapped sets of traits. Traits are presented in more detail later herein.

System Architecture

Figure 5:
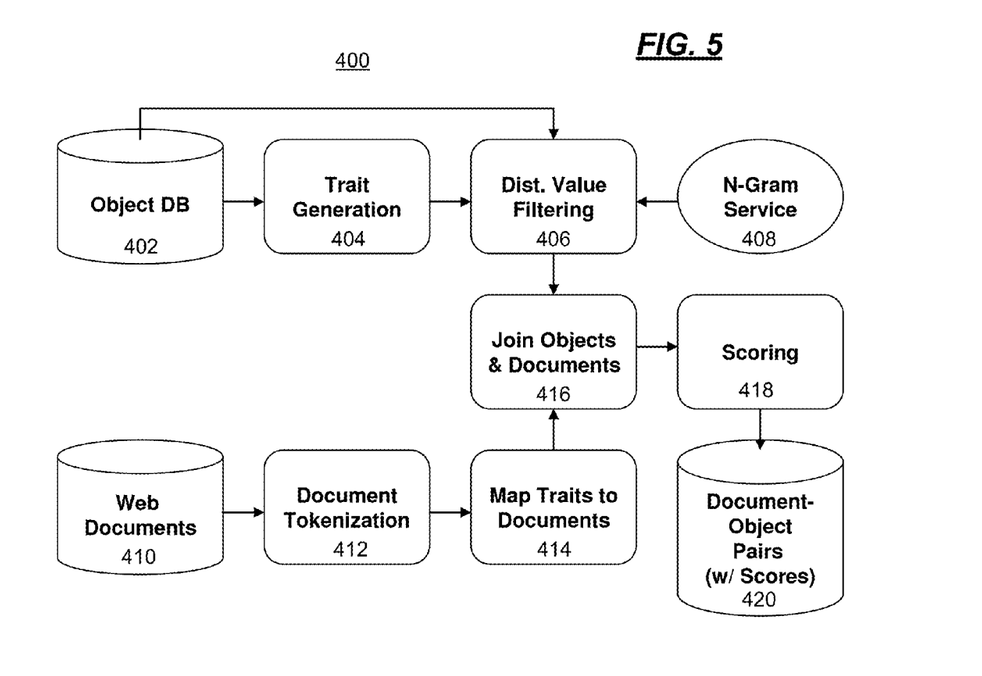
FIG. 5 is a block diagram of an exemplary system architecture for composing text and structured databases corresponding to one or more implementations disclosed herein.
Figure 6:
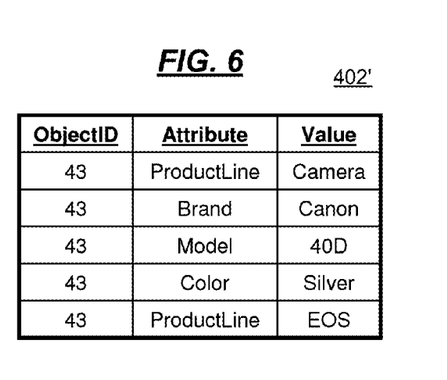
FIG. 6 is a table representing records corresponding to an object database illustrated in FIG. 5.
Figure 7:
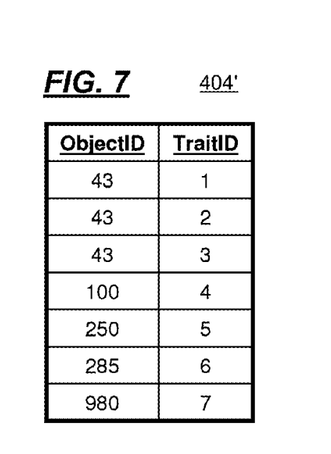
FIG. 7 is a table representing traits (by trait ID) determined for each object in the object database by the trait generator illustrated in FIG. 5.
Figure 8:
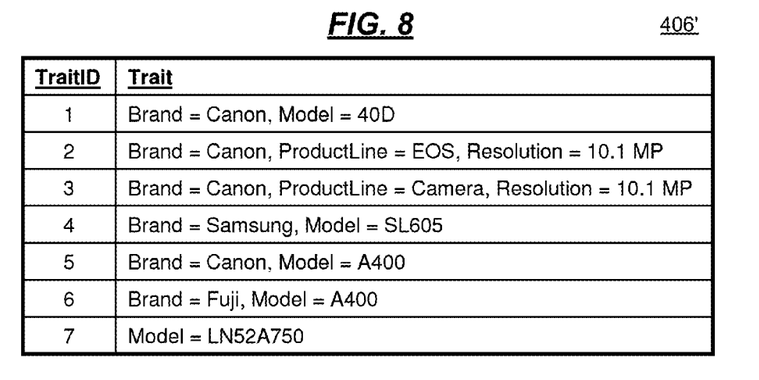
FIG. 8 is a table representing traits listed by trait ID derived by the trait generator and filtered by the filter (or filtering module) illustrated in FIG. 5.
Figure 9:
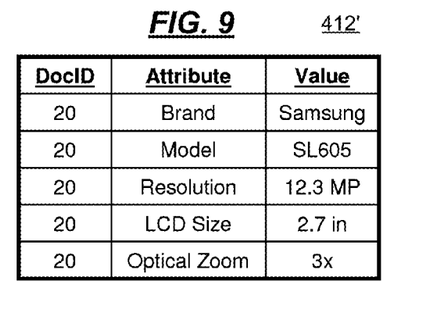
FIG. 9 is a table representing attributes and values corresponding to documents from among the web documents tokenized by the document tokenizer illustrated in FIG. 5.
Figure 10:
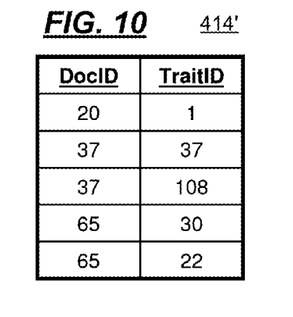
FIG. 10 is a table representing a mapping of trait IDs to document IDs produced by the mapping module illustrated in FIG. 5.
Figure 11:
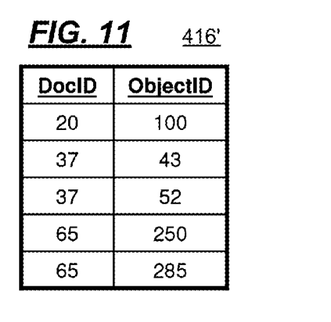
FIG. 11 is a table representing the joined data from the filter and the mapping module produced by the joiner module illustrated in FIG. 5.
Figure 12:
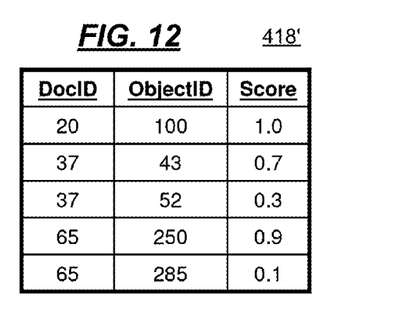
FIG. 12 is a table representing the document/object pairs scored by the scoring component illustrated in FIG. 5.

FIGS. 5-12 together illustrate aspects of an exemplary system architecture for various implementations disclosed herein. FIG. 5 is a block diagram of an exemplary system architecture 400 for composing text and structured databases corresponding to one or more implementations disclosed herein. FIG. 6 is a table representing records 402' (in rows) corresponding to an object database 402 illustrated in FIG. 5. FIG. 7 is a table representing traits 404' (with rows organized by trait ID) that are determined for each object in the object database 402 by the trait generation 404 illustrated in FIG. 5. FIG. 8 is a table representing traits 406' listed by trait ID derived by the trait generation 404 and filtered by the filtering module (or filter) 406 illustrated in FIG. 5. FIG. 9 is a table representing attributes 412' and values corresponding to documents from among the web documents 410 tokenized by the document tokenization 412 illustrated in FIG. 5. FIG. 10 is a table representing a mapping 414' of trait IDs to document IDs produced by the mapping module 414 illustrated in FIG. 5. FIG. 11 is a table representing the joined data 416' from the resulting table 406' from the filtering module 406 and the mapping 414' from the mapping module 414 produced by the joiner module 416 illustrated in FIG. 5. FIG. 12 is a table 418' representing the document/object pairs 420 scored by the scoring component 418 illustrated in FIG. 5.

Figure 13:
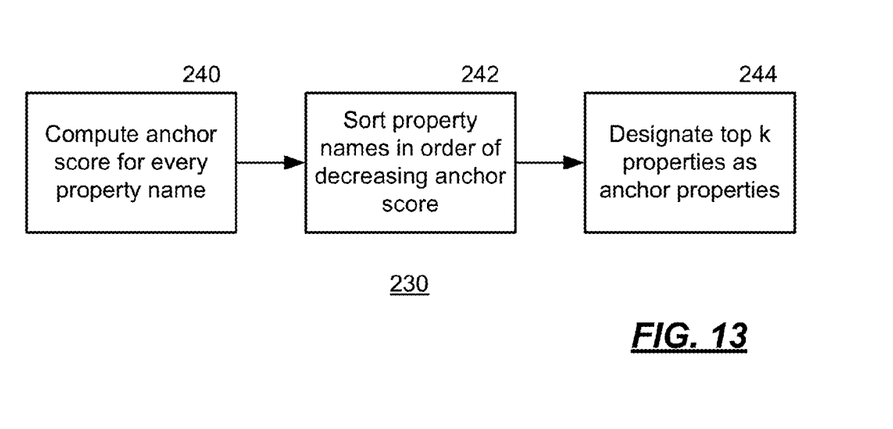
FIG. 13 is a process flow diagram representing a method for algorithmically determining anchor properties for several implementations.
Figure 14:
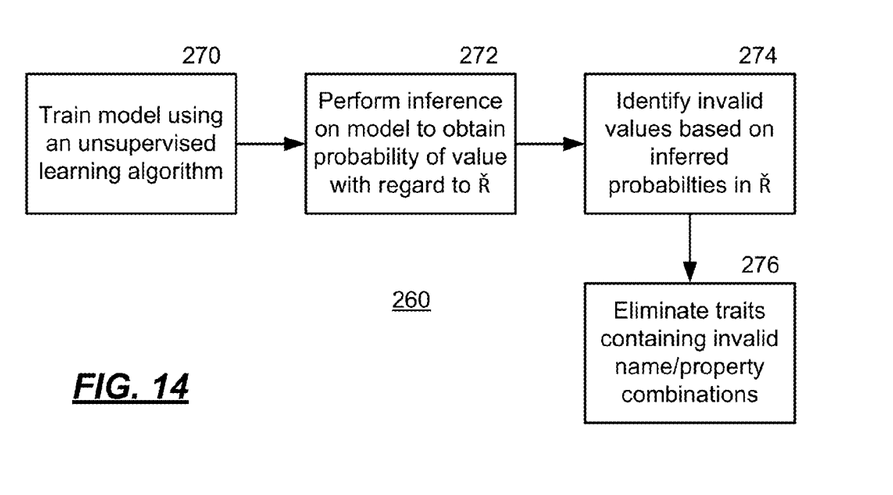
FIG. 14 is a process flow diagram representing a method for filtering out traits containing commonly found values in a particular corpus that may be utilized by certain implementations disclosed herein.
Figure 15:
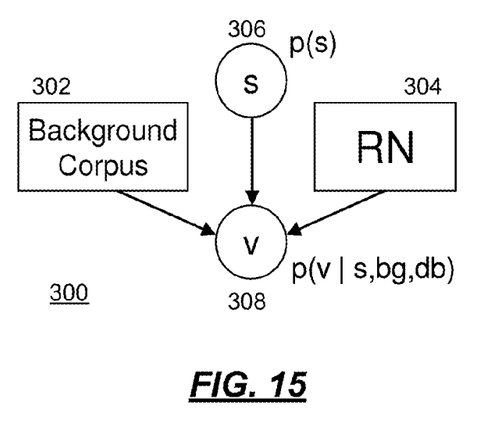
FIG. 15 is a block diagram illustrating a generative model for finding invalid trait values that may be utilized by some implementations disclosed herein.

As illustrated in FIG. 5, and with regard to FIGS. 6-12 described above, data from an object database 402 (represented by the table of FIG. 6) is utilized by a trait generator (shown as trait generation 404) to generate traits (represented by the tables of FIG. 7 and FIG. 8) that are then, in turn, filtered by a "distinguishing value" filter (shown as dist. value filtering 406) which, for certain implementations, may use an N-Gram Service component 408 (discussed further with regard to FIG. 14 and FIG. 15). Separately, data from web documents 410 is processed by a component for document tokenization 412 to identify characteristics (represented by the table of FIG. 9). Once the characteristics have been identified in the documents, the mapping module 414 (a.k.a., the mapping function) maps the documents to the set of traits previously computed and filtered (at 404 and 406 respectively) using the resulting tables 412' and 406'. This mapping function essentially relies on matching characteristics found in the documents with those present in the traits. The traits from the filtering module 406 and mapping module 414 are then joined in a joiner module 416 to determine traits overlapping both the web documents 410 and the records in the object database 402—that is, the joiner module 416 joins the tables 414' with 406' to form table 416' (of FIG. 11). This information is then scored (discussed later herein with regard to FIG. 13) user a scoring component 418 (a.k.a., the scoring function) from which final traits comprising document/object pairs with scores 420 (thereby yielding table 418' of FIG. 12 from table '416) are determined and stored.

Figure 17:
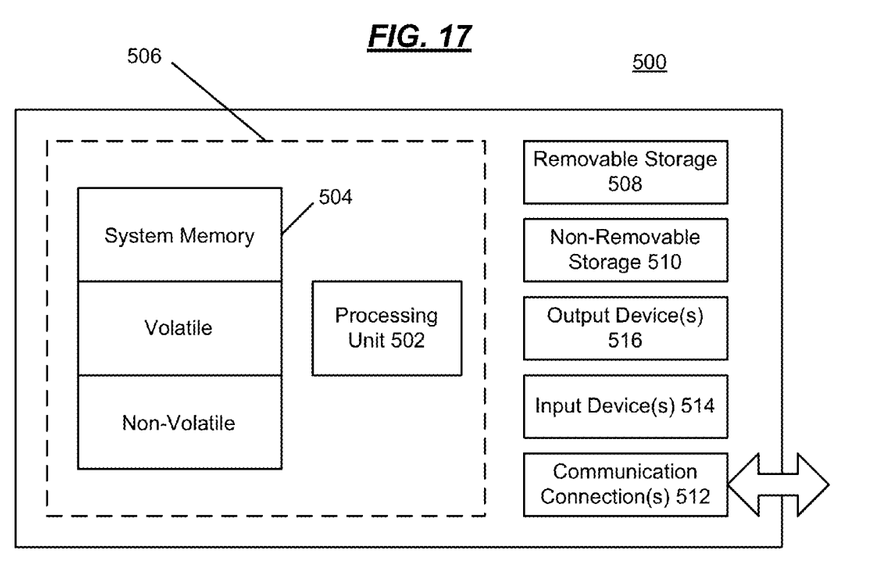
FIG. 17 is a block diagram of an example computing environment that may be used in conjunction with example implementations and aspects.

As will be readily appreciated by skilled artisans, the various modules and components (or functions) herein described—including but not limited to one or more of the trait generation 404, filtering 406, N-Gram service component 408, document tokenization 412, mapping module 414, joiner module 416, and scoring component 418—may be implemented in hardware and software using, for example, a computer processor such as the computer processor referred to in FIG. 17. Likewise, the object database 402, web documents 410, and the document/object pairs with scores 420 may be maintained in memory or other computer-readable media also referred to with regard to FIG. 17.

Utilizing the aforementioned system described in FIG. 5, various implementations disclosed herein are thereby able to link information from at least two data sources—including a first data source comprising documents comprising text pertaining to at least one object, and a second data source comprising structured records comprising at least one characteristic of the at least one object, each characteristic comprising at least one property name and an associated property value corresponding to the property name for the at least one object—and utilizing a processor (and/or other operational modules and components) for determining one or more instance-based traits for each object and for associating at least one record in the second data source with the at least one document from the first data source that refers to each object, each trait comprising one or more characteristics that identifiably distinguish each object from among all other objects in the plurality of documents. Several implementations are also directed to methods for linking information from at least two data sources by describing a plurality of objects using a set of characteristics wherein each object comprising the plurality of objects is identifiably distinguishable by one or more characteristics from among the plurality of characteristics, and then using at least one additional characteristic that does not comprise the set of characteristics to score a document's relevancy to a record from a first data source that shares at least one of the characteristics of a document from a second data source, wherein the additional characteristic is from the document. Yet other implementations are also directed to computer-readable instructions that cause a processor to map a plurality of documents in a first data source to a plurality of traits in a second data source, and then score the relevancy of a document from among the plurality of documents to at least one record from the second data source based on at least one of the characteristics of the document.

Traits

Since there is no access to Ö, various implementation disclosed herein generate traits from the only concrete representation of Ö available—namely Ř. Moreover, these traits are instance-based rather than schema-based and thus different objects may have traits comprised of different characteristics, and it is also possible for objects to have more than one trait.

To more formally define what constitutes a trait and a computation procedure for that trait, various implementations disclosed herein begin with a record R∈Ř that exhibits a characteristic (N,V) iff (N,V)∈R. For a given integer ρ, a set of characteristics T constitute a ρ-trait of Ř (or simply trait, when ρ is clear from the context) iff Ř contains at least one and at most ρ records each of which exhibits every characteristic in T and no proper non-empty subset of T constitutes a trait. As used herein, Ť denotes the set of all traits of Ř. Because Ř is an imperfect representation of Ö, the definition of a trait deliberately allows for values of ρ to be greater than one (to accommodate the possibility of objects having multiple representations in Ř), although the degree of this "relaxation" (i.e., how much higher than one β is permitted to be) depends on the expected multiplicity of representations in Ř. For example, if Ř has been created from n data providers who have overlapping content, setting ρ←n would be reasonable. Of course, the flip side of "relaxation" is that a trait may now represent multiple objects (and unnecessarily so). At the time of composition, therefore, certain such implementations may use additional information present in the records and text documents to alleviate this ambiguity.

Computing Traits

For various implementations disclosed herein, it is recognized that there is a connection between the problem of finding traits and the problem of finding infrequent itemsets. In a database of records comprising items, a set of items is referred to as a ρ-frequent itemset if all these items are present in at least ρ records. Correspondingly, an itemset is ρ-infrequent if it is present in fewer than ρ records. Subsets of frequent itemsets are also frequent and supersets of infrequent itemsets are also infrequent. A minimal ρ-infrequent itemset is one which is ρ-infrequent but each of its proper subsets is ρ-frequent. Thus, the problem of computing all ρ-traits is same as the problem of computing all minimal (ρ+1)-infrequent itemsets.

As known and appreciated by skilled artisans, all minimal ρ-infrequent itemsets can be found in output quasi-polynomial time, i.e., time which is bounded by a quasi-polynomial in total number of minimal ρ-infrequent itemsets. Depth-first recursive algorithms for computing a given number of them are also known to skilled artisans. To generate all traits up to a certain maximum cardinality, a breadth-first algorithm may be used for trait generation that is suitable for implementation over data using database primitives.

Recalling that a trait $T \leftarrow F\{X\}$, where $X \in \check{X}$ and $\check{X}$ denotes the set of all characteristics exhibited in $\check{R}$, and where $T^i$ is used herein to denote the set of all traits such that each trait has a cardinality of i, then for a given $\rho$ the following "TraitGen" Algorithm 1 (employed by several implementations herein) will produce all $\rho$-traits of cardinality up to $i_{max}$, or in other words, the following "TraitGen" Algorithm 1 will correctly compute all $\rho$-traits of R for the specified values of $\rho$ and imax:

---
Algorithm 1: TraitGen algorithm for mining $\rho$-traits

Input: Structure Database $\check{R}$, Largest cardinality of desired traits $i_{max}$, Parameter $\rho$
Output: $\cup_{j=0}^{imax} \check{T}^j$
1: $\check{T}^0 \leftarrow \emptyset$
2: for $i \in 1..i_{max}$ do
3:     $C^i \leftarrow \{X^i \in P(\check{X}) \mid |\{X^i \in R \mid R \in \check{R}\}| \leq \rho\}$
4:     $F^i \leftarrow \{T^i \in C^i \mid \exists\, T \in P(T^i) \text{ s.t. } T \in \cup_{j=0}^{imax} \check{T}^j\}$
5:     $T^i \leftarrow C^i - F^i$
6: Output $\cup_{j=0}^{imax} \check{T}^j$

---

Because $\check{R}$ is an imperfect representation of $\ddot{O}$, particular attention is given to how traits are generated. For example, simply using any original combination of characteristics in $\check{R}$ as originally found in $\check{R}$ can result in sparsity and duplicity of object representations. Therefore, in order to have effective traits, certain implementations disclosed herein operate such that every trait contains at least one "anchor property" that may be thought of as endowing pseudo-keys to the data. By analogy, just as names are a useful but imperfect method for distinguishing people, and phone numbers do a fairly good job of distinguishing businesses, anchor properties are those that have a large number of non-repetitive values that are well-distributed amongst records in the database.

FIG. 13 is a process flow diagram 230 representing a method for algorithmically determining anchor properties for several implementations. At 240, an anchor score is computed for every property name where a property's anchor score is the normalized entropy computed over all the values for that property. For example, let $\check{N}$ represent all the property names present in $\check{R}$. Using $\{\{\ldots\}\}$ to denote a bag, compute the anchor score of every property name $N \in \check{N}$ as follows:

$$\check{V}' \leftarrow \{\{V \mid (N,V) \in R \wedge R \in \check{R}\}\} \quad (1)$$
$$\check{V} \leftarrow \{V \mid (N,V) \in R \wedge R \in \check{R}\}$$
$$\text{Anchor Score} \leftarrow \text{Entropy}(\check{V}')/\log |\check{V}|$$

At 242, the property names are sorted in the decreasing order of their anchor score. At 244, the top k of the properties having the highest anchor scores are designated as anchor properties. Generally there is a sudden steep fall off in anchor scores, and methods for determining k are known to skilled artisans.

Intuitively, an anchor score indicates the distinctiveness of values for the corresponding property name, and it is generally beneficial to have traits comprising distinctive properties. It should also be noted that the choice of k influences the choice of $i_{max}$ in Algorithm 1, as a trait comprised entirely of anchors would be a powerful trait. As such, it would make sense to set $i_{max} \geq k$ in Algorithm 1, and it may also be beneficial for the results of Algorithm 1 to be adapted (or possibly restricted) to ensure that every trait is anchored.

Mapping Records to Traits

When the trait set $\check{T}$ to which records of $\check{R}$ need to be mapped has been generated from $\check{R}$ itself, the TraitGen Algorithm 1 for certain alternate implementations may be modified to concurrently enumerate and persist the $\check{R} \rightarrow \check{T}$ mappings while generating traits. On the other hand, a trait set may also have been obtained from an independent source such as, for example, a manually curated set. In such instances where every record $R \in \check{R}$ has an internal identifier—referred to herein as R.rid, which uniquely designates R—the mappings from records to their traits may be kept in a table (RT) with entries in the form (R.rid,R.trait). Given such a trait set $\check{T}$, then $RT \leftarrow \{(R.rid,T) \mid T \in \check{T} \wedge \exists R \text{ s.t. } T \subseteq R\}$ will bind all the records in $\check{R}$ to their traits.

Mapping Documents to Traits

Mapping a given document to traits from a given trait set is more challenging than just employing fast data structures for locating relevant traits within the document because the vocabulary used in the documents might be different than found in the structured data. However, this difficulty is ameliorated by certain implementations by using semantic translations of the values present in trait.

Another challenge is preventing distinguishing values within the structured database from being ambiguous in the text corpus. For example, both "LunarFly+" and "Free" are lines of Nike running shoes that might find their way into the trait set generated from a product database, but while the former trait is quite distinguishing the latter may be significantly ambiguous in many text corpora. Therefore, various implementations may preclude trait sets that include words that may be significantly ambiguous in view of at least the specific text corpus being utilized—that is, precluding at least one characteristic that is deemed to be too ambiguous in view of the content of text document data source.

Similarly, it is beneficial to prevent attributes of any specific text corpus from creeping into the trait generation process despite the temptation to do so with the intent of creating broadly applicable traits as introducing this kind of generality is often not necessary when mapping documents from a certain text corpus into traits and typically only serves to diminish the efficiency and effectiveness of the results. On the other hand, information may be used from a particular corpus to filter out traits containing commonly found values, and a method employed by certain implementations herein may utilize a probabilistic model as described in the next section.

Identifying Valid Values for Traits

For implementations where removing traits containing values that are common in the context of the text repository on which composition is performed may be beneficial, such implementations may utilize statistics of words (in particular, probability of occurrence) in the text repository to compare to occurrences in the structured repository $\check{R}$. The comparison may be performed for each property name and their corresponding values. For these implementations, the methodology addresses the challenge of identifying valid values as probabilistic inference in a generative model for values generated from the values present in $\check{R}$ for the corresponding property name and/or from a background text corpus.

FIG. 14 is a process flow diagram 260 representing a method for filtering out traits containing commonly found values in a particular corpus that may be utilized by certain implementations disclosed herein. At 270, the model is trained using an unsupervised learning algorithm that does not require manually labeled input. Then, once the model is learned, at 272 an inference may be performed on the model to obtain the probability of a value being explained using $\check{R}$. At 274, those values with inferred probabilities in $\check{R}$ below a threshold value (z) are identified as ambiguous (and hence invalid) values and, at 276, those traits that contain invalid property name/value combinations are pruned or eliminated as invalid.

In the context of the text corpus, and for some implementations, an N-gram computation (performing an N-Gram analysis) derived from the web corpus may be used to identify invalid values when the text documents are from the general pool of web pages. These values then become identifiers for use in subsequently identifying and removing (or "pruning") such traits because these traits are deemed invalid for associating the records to the text documents. In this regard, $\check{R}^N = RN = \{v_1, \ldots, v_K\}$ are the values for the property name N and correspond to K records in $\check{R}$ (where herein $\check{R}^N = RN$ are used interchangeably). It should be noted that $v_i = v_j$ when the records i and j share the same value for the property name N.

FIG. 15 is a block diagram illustrating a generative model 300 for finding invalid trait values that may be utilized by some implementations disclosed herein. As illustrated in the figure, a generative model 300 comprises a value 308 that is present in the background corpus 302 and is also a value 304 for the property name N in $\check{R}$ and related to the binary selection variable s 306. The binary selection variable s 306 is discussed in more detail below with regard to FIG. 16.

Figure 16:
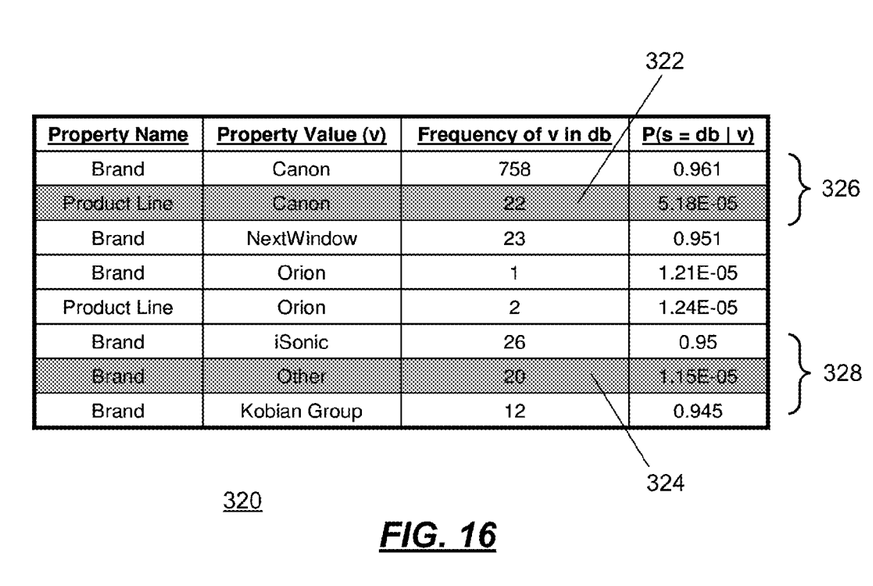
FIG. 16 is a table representing examples of valid and invalid trait values that may be detected by the generative model of FIG. 15.

FIG. 16 is a table 320 representing examples of valid and invalid trait values detected by the generative model 300 of FIG. 15 (with invalid values 322 and 324 denoted by shaded rows). In operation, the binary selection variable s (306 in FIG. 15), along with prior p(s), defines which of the two sources is responsible for generating the value v. Hence, s takes two values, db and bg, corresponding to whether the value is generated from RN or from the background corpus respectively. Thus the probability of generating a value is defined by the choice of s and is given by p(v|s) as follows:

$$p(v \mid s) = \begin{cases} p(v \mid bg) & \text{if } s = bg \\ p(v \mid RN) & \text{if } s = db \end{cases} \quad (2)$$

In equation (2), p(v|bg) and p(v|RN) are probabilities of observing the value in the background corpus and in RN. The joint probability p(v,s) is given by p(v,s)=p(s)p(v|s). When the text documents that correspond to web pages are considered, a corpus of web pages may be used to build the background model and, in particular, a web N-gram service may be used to estimate p(v|bg).

Given an observed value v=v*, various such implementations determine probabilistic inference by computing the posterior distribution over the unknown variables in the model. This amounts to inferring p(s=s*|v=v*), where s*∈{bg, db}. This, in turn, enables the performance of probabilistic inference by applying the Bayes rule:

$$p(s = s^* \mid v = v^*) = \frac{p(v = v^* \mid s = s^*)p(s = s^*)}{\sum_{s=\{bg,db\}} p(v = v^* \mid s)p(s)} \quad (3)$$

While p(v|RN), on the other hand, may be approximated by some such implementations using relative frequency counts of values in RN, other such implementations may instead learn these parameters such that those values that are more fully explained using the background model are down-weighted in the p(v|RN) calculation. For learning p(v|RN), in turn, training data may comprise only of those values, {vk}, currently present in RN. Then, assuming each value in RN is independent and identically distributed, an estimate θ*=p(v|RN) can be obtained by maximizing p(RN) as follows:

$$\theta^* = \arg\max_\theta p(RN) = \arg\max_\theta \prod_k p(v_k) = \quad (4)$$

$$\arg\max_\theta \log \prod_k p(v_k) = \arg\max_\theta \sum_k \log \sum_{s_k} p(v_k, s_k) =$$

$$\arg\max_\theta \sum_k \sum_{s_k} p(s_k \mid v_k) \log \frac{p(v_k \mid s_k)p(s_k)}{p(s_k \mid p_k)}$$

These implementations then solve for θ* by maximizing the observation probability using the iterative Expectation Maximization algorithm wherein there is iteration between the Expectation(E-) step and the Maximization(M-) step. Starting with the initial close to uniform probabilities over values, in the E-step, these implementations perform probabilistic inference using equation (3) to obtain p(sk|vk) for each data point. In the M-step, these implementations then use the following distribution to fill-in for the unobserved $s_k$ to compute the current estimates for θ:

$$p(v = v' \mid RN) = \frac{\sum_k p(s_k = db \mid v_k = v')I(v_k = v')}{\sum_k p(s_k = db \mid v_k = v')} \quad (5)$$

In this equation (5), I(vk=v') is the indicator function that evaluates to one (1) when vk=v'. This equation can be derived from equation (4) by taking derivatives with respect to p(v=v|RN).

After learning the parameters of the model, and for each value in the database, these implementations perform inference using equation (3) to find the probability of the value being explained by the database and then prune traits that contain common values that do not meet a chosen threshold on this probability. FIG. 13 shows examples of property <name,value> pairs that are identified as valid (or invalid) to be present in the traits (as discussed earlier herein).

Composition

With mappings obtained from structured records as well as text documents to the same set of traits, various implementations may compose information about the same objects from the two repositories by doing a natural join on traits (e.g., by composing information pertaining to a set of objects common to the two data sources based on set the characteristics). However, since traits are computed from an imprecise representation of Ö, several such implementations use a function that provides a probabilistic score of agreement between matched documents and structured records.

For these implementations, the scorer is defined using binary logistic regression based on a set of features that measure the similarity between a text D and a record R. Given matched and mismatched training pairs, $\{F, Y\} = \{(f_1, y_1), (f_T, y_T)\}$ is the set of feature vectors along with their corresponding binary labels. Logistic regression maximizes the conditional log-likelihood of the training data: arg max log P(Y|F, w)=arg $\max_w \sum_{i=1}^T$ log P($y_i|f_i$,w), where w is the weight vector wherein each component $w_j$ measures the relative importance of the feature $f_j$ for predicting the label y, and P(y=1|f,w)←1/(1+exp(−(b+$f^T$w))).

Since text documents generally contain larger number of property values corresponding to more relevant objects than less relevant ones and, in addition, also mention the more relevant objects with a much higher repetition frequency, two features that can be determined from the text document include: (1) a fraction of distinct property names corresponding to property values found in the joining structured record and the text document that overlap, and (2) a weighted fraction of property values that overlap, where the weight is determined through the relative frequency of the corresponding property name, property value pairs. For these features, and because a small number of features is used, there is no need for a large amount of training data.

Various implementations disclosed herein, and generally outlined in FIG. 5, address the problem of composing structured and text databases about objects in a very general setting, making minimal assumptions. Structured databases contain partial and possibly multiple representations of objects comprising property name and value pairs. Texts are bags of words devoid of any markings or structure that explicitly identifies the objects that the document is about. The notion of a trait is postulated herein as a set of characteristics that can serve as the proxy for the identity of an object, and techniques are presented herein for algorithmically computing traits, mapping structured records and text documents to traits, and using traits for joining information about the same object from two repositories.

FIG. 17 is a block diagram of an example computing environment that may be used in conjunction with example implementations and aspects. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 17, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 17 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 17 by removable storage 508 and non-removable storage 510.

Computing device 500 typically includes a variety of computer readable media. Computer readable media can be any available media that can be accessed by device 500 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

Computing device 500 may be one of a plurality of computing devices 500 inter-connected by a network. As may be appreciated, the network may be any appropriate network, each computing device 500 may be connected thereto by way of communication connection(s) 512 in any appropriate manner, and each computing device 500 may communicate with one or more of the other computing devices 500 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for linking information from at least two data sources, the system comprising:
    a first data source comprising a plurality of documents comprising text pertaining to at least one object;
    a second data source comprising a plurality of structured records comprising at least one characteristic of the at least one object, each characteristic comprising one property name and an associated property value corresponding to the property name for the at least one object;
    a processor for determining one or more traits for each object and for associating at least one record in the second data source with the at least one document from the first data source that refers to each object, wherein each trait is instance-based and comprises at least one characteristic that serves as a proxy for identifying each object from all other objects in the plurality of documents, and wherein at least one of the one or more traits has a different number of characteristics than another trait; and
    wherein the system determines that an association of a first trait to a first record is correct if a first text from a first document pertains to either the first record or to an accessory of the product represented by the first record.

2. The system of claim 1, wherein each trait that identifiably distinguishes the at least one object from among all other objects comprises a combination of two or more characteristics that serve as the proxy.

3. The system of claim 1, further comprising a mapping function, performed by the processor, to associate traits in the structured records and the plurality of documents.

4. The system of claim 3, further comprising a scoring function, performed by the processor, to score at least one text document's relevancy to at least one record that shares at least one trait.

5. The system of claim 4, wherein the scoring performed by the processor utilizes at least one additional characteristic present in the plurality of documents and in the structured records but not included in the traits.

6. The system of claim 1, wherein the processor further computes an N-gram computation derived from a corpus in order to identify at least one invalid trait, and wherein the processor further prunes at least one instance-based trait based on the N-gram computation.

7. The system of claim 6, wherein the processor further determines at least one instance-based trait for the at least one object that would enable at least one record in the second data source to be associated with the at least one document from the first data source that refers to the at least one object.

8. The system of claim 1, wherein the second data source comprises a plurality of web-based pages.

9. The system of claim 8, wherein a set of objects from the second data source pertain to products.

10. A method for linking information from at least two data sources, the method comprising:
    describing a plurality of objects using a set of characteristics as a plurality of traits, wherein each trait in the plurality of traits is instance-based and serves as a proxy to identify each object from other objects in the plurality of objects, and wherein at least one of the plurality of traits has a different number of characteristics than another trait;
    using at least one additional characteristic that does not comprise the set of characteristics to score a relevancy of a document to a record from a first data source that shares at least one of the characteristics of another document from a second data source, wherein the additional characteristic is from the document; and
    determining that an association of a first trait to a first record is correct if a first text from a first document pertains to either the first record or to an accessory of the product represented by the first record.

11. The method of claim 10, wherein a trait from among the plurality of traits comprises at least one anchor property, and wherein the at least one anchor property is determined by an anchor score corresponding to a relative distinctiveness of a value for at least one corresponding property name in the trait.

12. The method of claim 10, wherein at least one trait from among the plurality of traits is filtered out using an N-Gram analysis, wherein each trait comprises a characteristic from the set of characteristics.

13. The method of claim 10, further comprising precluding at least one characteristic that is ambiguous in view of the first data source.

14. The method of claim 10, further comprising composing information pertaining to a set of objects common to the two data sources based on set the characteristics.

15. A method comprising:
    mapping a plurality of documents in a first data source to a plurality of traits in a second data source, wherein each trait in the plurality of traits comprises one or more characteristics, is instance-based, and serves comprises as a proxy for uniquely identifying each object from among a plurality of objects, and wherein at least one of the plurality of traits has a different number of characteristics than another trait;
    scoring the relevancy of a document from among the plurality of documents to at least one record from the second data source; and
    determining that an association of a first trait to a first record is correct if a first text from a first document pertains to either the first record or to an accessory of the product represented by the first record.

16. The method of claim 15, further comprising identifying the plurality of traits from among the traits present in both the first data source and the second data source.

17. The method of claim 15, further comprising composing the first data source and the second data source based on the mapping and scoring.

18. The method of claim 15, wherein each trait from among the plurality of traits comprises at least one anchor property that operates as a pseudo-key in the second data source.

19. The method of claim 18, wherein the at least one anchor property is determined by an anchor score corresponding to a relative distinctiveness of a value for at least one corresponding property name in the trait.

* * * * *